(12) United States Patent
Marian et al.

(10) Patent No.: US 11,272,318 B2
(45) Date of Patent: *Mar. 8, 2022

(54) PROXIMITY MEASUREMENT SYSTEM

(71) Applicant: Intel Corporation, Santa Clara, CA (US)

(72) Inventors: Tal Marian, Tel Aviv (IL); Michal Oren, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/814,708

(22) Filed: Mar. 10, 2020

(65) Prior Publication Data

US 2020/0213808 A1 Jul. 2, 2020

Related U.S. Application Data

(63) Continuation of application No. 15/177,545, filed on Jun. 9, 2016, now Pat. No. 10,602,308.

(51) Int. Cl.
*H04W 24/00* (2009.01)
*H04W 4/02* (2018.01)
(Continued)

(52) U.S. Cl.
CPC ............ *H04W 4/023* (2013.01); *G08B 21/24* (2013.01); *H04L 67/22* (2013.01);
(Continued)

(58) Field of Classification Search
CPC ..... H04W 4/023; H04W 4/029; H04W 4/021; H04W 4/022; H04W 4/02;
(Continued)

(56) References Cited

U.S. PATENT DOCUMENTS 6,587,782 B1 7/2003 Nocek et al.
8,471,701 B2 6/2013 Yariv et al.
(Continued)

FOREIGN PATENT DOCUMENTS

WO WO-2017213791 A1 12/2017

OTHER PUBLICATIONS

"U.S. Appl. No. 15/177,545, Non Final Office Action dated Jul. 10, 2017", 14 pgs.

(Continued)

*Primary Examiner* — Stephen M D Agosta
(74) *Attorney, Agent, or Firm* — Schwegman Lundberg & Woessner, P.A.

(57) ABSTRACT

Various systems and methods for providing a proximity measurement system are provided herein. A proximity measurement system includes: a user tracking service to calculate a travel area of a user, the travel area representing an area that the user has traveled within during a period of time, a proximity service to: identify a reminder task created by the user, the reminder task having an associated point of interest; identify a plurality of geographical locations of the point of interest; and calculate an effective proximity measure based on the travel area of the user and the plurality of geographical locations; and a notification service to transmit a notification to the user when the user is within the effective proximity measure of any one of the plurality of geographical locations.

20 Claims, 6 Drawing Sheets

(51) Int. Cl.
*H04W 4/021* (2018.01)
*H04W 4/029* (2018.01)
*H04M 1/72436* (2021.01)
*H04M 1/72451* (2021.01)
*H04M 1/72457* (2021.01)
*G08B 21/24* (2006.01)
*H04L 67/50* (2022.01)

(52) U.S. Cl.
CPC ... *H04M 1/72436* (2021.01); *H04M 1/72451* (2021.01); *H04M 1/72457* (2021.01); *H04W 4/021* (2013.01); *H04W 4/022* (2013.01); *H04W 4/029* (2018.02)

(58) Field of Classification Search
CPC ......... H04M 1/72436; H04M 1/72457; H04M 1/72451; G08B 21/24; H04L 67/22; H04L 67/18; H04L 67/26; G01C 21/3679; G01C 21/3614; G01C 21/3682; G06F 16/29; G06F 16/9535; G06F 9/451
See application file for complete search history.

(56) References Cited

U.S. PATENT DOCUMENTS

| | | | |
|---|---|---|---|
| 8,600,659 B1* | 12/2013 | Scherzinger | G01C 21/3682 701/400 |
| 8,810,437 B2 | 8/2014 | Beyeler et al. | |
| 9,097,553 B2* | 8/2015 | Kurtti | G01C 21/3679 |
| 9,563,880 B2* | 2/2017 | Longobardi | G06Q 10/109 |
| 10,602,308 B2 | 3/2020 | Marian et al. | |
| 2003/0191578 A1 | 10/2003 | Paulauskas et al. | |
| 2003/0224762 A1* | 12/2003 | Lau | H04L 67/18 455/412.2 |
| 2004/0230685 A1* | 11/2004 | Seligmann | G01C 21/00 709/228 |
| 2006/0058948 A1* | 3/2006 | Blass | G01C 21/343 701/408 |
| 2008/0070559 A1* | 3/2008 | Behr | G08G 1/092 455/414.2 |
| 2008/0076451 A1 | 3/2008 | Sheha et al. | |
| 2009/0012955 A1 | 1/2009 | Chu et al. | |
| 2011/0057790 A1 | 3/2011 | Martin et al. | |
| 2011/0172887 A1* | 7/2011 | Reeve | A01B 79/005 701/50 |
| 2012/0046040 A1* | 2/2012 | Chatterjee | H04W 24/10 455/456.1 |
| 2012/0179321 A1* | 7/2012 | Biber | G05D 1/0259 701/25 |
| 2013/0009774 A1 | 1/2013 | Sabeta | |
| 2013/0054396 A1 | 2/2013 | Goldfinger et al. | |
| 2013/0262479 A1 | 10/2013 | Liang et al. | |
| 2014/0025296 A1 | 1/2014 | Shhimizu et al. | |
| 2015/0100271 A1 | 4/2015 | Wang et al. | |
| 2015/0287121 A1* | 10/2015 | Nakamura | G06Q 30/0282 701/537 |
| 2017/0359688 A1 | 12/2017 | Marian et al. | |

OTHER PUBLICATIONS

"U.S. Appl. No. 15/177,545, Non Final Office Action dated Aug. 2, 2019", 14 pgs.

"U.S. Appl. No. 15/177,545, Notice of Allowance dated Nov. 15, 2019", 12 pgs.

"U.S. Appl. No. 15/177,545, Response filed Nov. 4, 2019 to Non Final Office Action dated Aug. 2, 2019", 10 pgs.

"International Application Serial No. PCT/US2017/032170, International Preliminary Report on Patentability dated Dec. 20, 2018", 9 pgs.

"International Application Serial No. PCT/US2017/032170, International Search Report dated Aug. 24, 2017", 3 pgs.

"International Application Serial No. PCT/US2017/032170, Written Opinion dated Aug. 24, 2017", 7 pgs.

* cited by examiner

PROXIMITY MEASUREMENT SYSTEM

PRIORITY APPLICATION

This application is a continuation of U.S. application Ser. No. 15/177,545, filed Jun. 9, 2016, which is incorporated herein by reference in its entirety.

TECHNICAL FIELD

Embodiments described herein generally relate to networking and in particular, to a proximity measurement system.

BACKGROUND

A location-based service is a service that uses real time geographical data from a mobile device to provide information, entertainment, security, advertising, or other data to a user based on the user's location. As communication networks permeate the everyday world, location-based services have become an ever increasingly important function.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a proximity measurement system. With the emergence of mobile devices and particularly wearable technology it has become feasible to track a user's location and provide location based alerts. Specifically people want to know when they are "near to" branches of a chain business, a business of a certain business type, or other points of interest (POIs). People want to be able to get notifications when in effective proximity to locations such as a coffee shop chain (e.g., Starbucks®), a retail store (e.g., Walmart® or IKEA®), or another category of retailer or service provider (e.g., dry cleaners, car washes, etc.).

Although various implementations of geofence-based systems have been developed, several problems exist. For example, some implementations define proximity around a point of interest (POI) using a static threshold (e.g., a predefined radius measured in miles, feet, or other distance) that is not meaningful to the user. Static boundaries do not account for the geographic differences around different users. In some cases, static boundaries result in alerting a user too late when in effective proximity to scarce POIs and too early for POIs the user is often within effective proximity. For example, a user in Manhattan who is a mile from a Starbucks® would not be considered "close" to Starbucks® because there is at least one Starbucks® on every block. But, for a user in Wyoming in the middle of a state park, being a mile from a Starbucks® would be considered very close. What is needed is a proximity system that accounts for the user's environment and usual areas of traversal.

Being "in proximity to" is a subjective measure, based on routine and context. The systems and methods described herein take into account the user's behavior over time, such as a commute from home to work, typical errands, or other travel in a relatively confined area. The mechanism tracks the user's active area and the distance of target locations (e.g., points of interest) relevant to the user, to determine a proximity measure. The proximity measure may be dynamically updated based on the user's activities and is meant to reflect what a user may consider as being "near" or proximate. Proximate, as used in this description, refers to being close to something, which may depend on the mode of travel, the user's own perceptions, the priority of a task associated with the POI, or other aspects. For example, two miles is close when travelling by car, but may not be considered close when walking.

Figure 1:
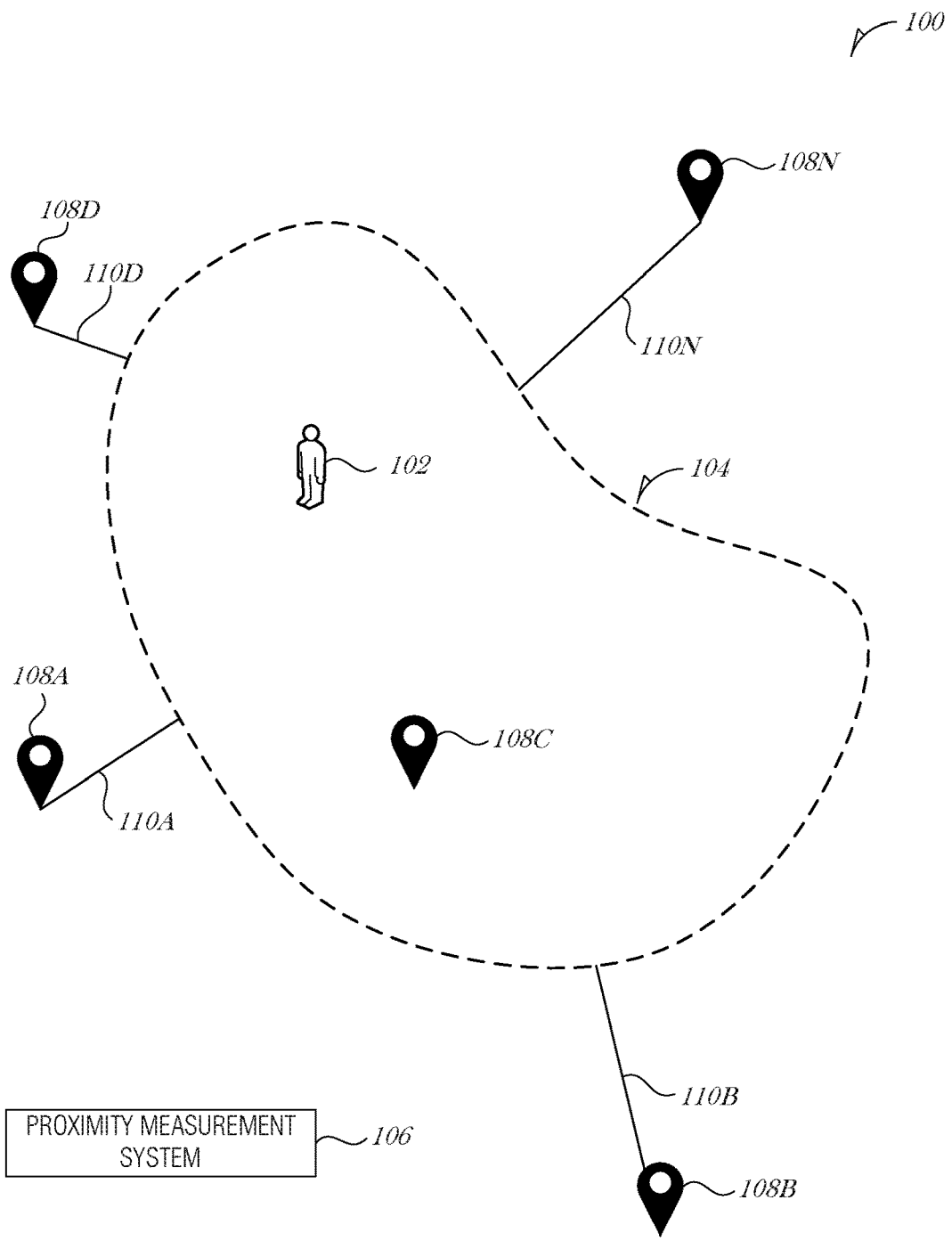
FIG. 1 is a schematic diagram illustrating an example operating environment, according to an embodiment.

FIG. 1 is a schematic diagram illustrating an example operating environment 100, according to an embodiment. The environment 100 includes a user 102 and a travel area 104. The travel area 104 may be defined by the monitoring the user 102 over a period, such as an hour, a day, or a week. A proximity measurement system 106 may receive data of the user's whereabouts. For example, the proximity measurement system 106 may periodically receive a global positioning system (GPS) coordinate from a user device operated by the user 102. The proximity measurement system 106 may receive the coordinates in response to a query transmitted to the user device. Alternatively, the user device may have an application or other executable file operating on the user device that transmits the coordinates.

As the user 102 travels around, the proximity measurement system 106 obtains coordinates and constructs a geometric representation (e.g., a polygon, circle, blob, etc.) that represents the user's travel area 104 in a given period. The travel area 104 may change shape over time as the user's travel changes. Coordinates that are used to create the geometric shape may be aged such that coordinates that are older are not used, or form the geometric shape differently, than those coordinates that are newer. In this way, the user's typical area of travel around work, school, and home are modeled by the travel area 104.

Multiple points of interest (POIs) 108A-N are in the operating environment 100. Although five POIs 108A-N are illustrated in the environment 100, it is understood that any number of POIs 108A-N may be included in actual operation. For the proximity measurement system 106 to function effectively, the preferable minimum number of POIs 108A-N is three.

POIs 108A-N are related by a category, type of service or business, or as a chain of businesses (e.g., franchises or branches). Examples of POIs 108A-N include, but are not limited to department stores, gas stations, coffee shops, retail stores, discount stores, restaurants, fast food chains, realtors, law firms, government centers (e.g., the department of motor vehicles), and the like.

The distance from the travel area 104 to the POIs 108A-N is referred to as the everyday_distance. The everyday_distance is a vector from the boundary of the travel area 104 to a particular POI 108A-N, and represents the shortest distance from the boundary of the travel area 104 to the POI 108A-N. For example, edge 110A is the everyday_distance for POI 108A, edge 110B is the everyday_distance for POI 108B, etc. In general, the everyday_distance represents how far a person may be from any given POI 108 during a given period (e.g., the period over which the travel area 104 shape was constructed). A POI that exists inside of the travel area 104, such as POI 108C, does not have an associated everyday_distance value.

The reference_distance is calculated in two parts. The first part is an average of the everyday_distance values for all of the POIs 108A-N. If all of the POIs 108A-N are within the travel area 104, the reference_distance is zero. This is a special case and is not addressed here because the usefulness of the proximity measurement system 106 is substantially mitigated as the user 102 is almost always "proximate" to at least one POI 108A-N.

Figure 2:
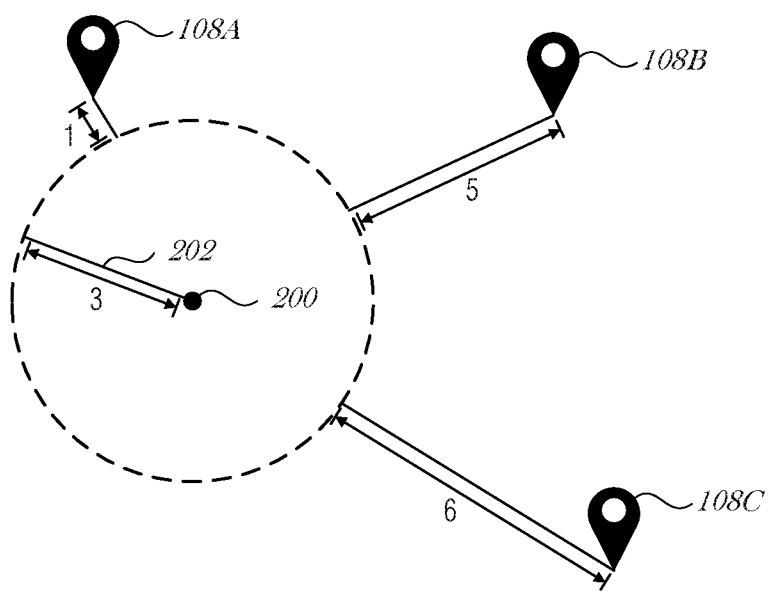
FIG. 2 is an example travel area, according to an embodiment.

The second part of the reference_distance is to account for half of the width of the travel area 104. If the travel area 104 is a circle, for example, then the second part of the reference_distance is the radius of the circle. For other shapes, the second part of the reference_distance may be calculated in various ways, such as by averaging the length of vectors from the centroid of the shape to the edges. An example shape is shown in FIG. 2 that illustrates the second part of the reference_distance.

For the example illustrated in FIG. 1, the second part of the reference_distance will be considered to be four miles. Thus, the reference_distance is calculated as the sum of the two parts, the average distance of the everyday_distance and the "radius" of the travel area 104.

The effective_proximity_measure is a percentage of the reference_distance and may have a default percentage value. In an embodiment, the default percentage value associated with the effective_proximity measure is 20%. As such, in a default setting, when the user 102 is within 20% of the reference_distance of a POI 108A-N, then the user 102 may be presented with a reminder. In effect, a personalized geofence is constructed around the POI 108A-N with a radius of the effective_proximity_measure. The percentage value may decrease with a lower priority task (e.g., the user 102 has to be closer to a POI 108A-N before being notified) and conversely increase with a higher priority task (e.g., the user 102 may be farther from the POI 108A-N and be notified).

In operation, the user 102 may access an application on their user device (not shown) and set a reminder task. The reminder task is related to a POI 108A-N. For example, the user 102 may want to buy lightbulbs for their apartment. The user 102 may set a reminder task to buy lightbulbs from Target® store. The user 102 may assign a priority to the "buy lightbulbs" task. For example, the user 102 may assign a "normal" priority, which means that the priority for the task is neither high or low priority, but a default middle value.

In this situation, the POIs 108A-N may represent locations of Target® stores around the user's travel area 104. If the reference_distance is fifteen miles (made up of an eleven mile average everyday_distance and a four mile "radius" of the travel area 104), and the percentage value of the effective_proximity_measure associated with a default priority is 20%, then the effective_proximity_measure is calculated as three miles (20% of fifteen miles). When the user 102 is detected to be within a three mile radius of one of the POIs 108A-N, the user 102 is presented with a notification to remind them of the "buy lightbulbs" task.

The user 102 may also have another task to buy their friend a wedding present. The user 102 may set a "wedding present" reminder task and associate with the Target® POIs 108A-N. The user 102 may also set a due date and also a priority.

In this case, the percentage value of the effective_proximity_measure may be raised, for example to 40%. As such, the effective_proximity_measure is increased to six miles, such that if the user 102 is within six miles of any of the POIs 108, a notification may be provided to the user 102 to buy the wedding present. By increasing the effective_proximity_measure percentage value, the user 102 is made aware of the POI 108A-N at a farther distance than that of a normal priority reminder task. As the wedding approaches, the priority may change either by the user 102 or programmatically by the application on the user device or at the proximity measurement system 106. For instance, if the user 102 has not completed, dismissed, or acknowledged the "wedding present" reminder task on the day before the wedding, the priority may increase to a maximum threshold (e.g., 100%), such that the user 102 is notified of the "wedding present" reminder task when the user 102 is within the reference_distance of any POI 108A-N. Based on the user's usual routes traveled throughout the day, represented by the travel area 104, the user 102 should have at least one notification of the "wedding present" reminder.

In the case of a lower priority task, the percentage value of the effective_proximity_measure may be lowered, for example to 5%. As such, the effective_proximity_measure may be decreased to 0.75 miles. Basically, the user 102 is only notified of a lower priority task if the user 102 is very close to a POI 108A-N.

It is understood that the percentages used in these examples are illustrative and that any percentages may be used. The percentages may be set by a system provider, the user 10:2, an administrative user, or by other mechanisms. The priority may automatically or manually change over time. For example, the user 102 may modify the priority after creating the reminder task. As another example, the reminder task may have a due date and the priority may increase as the due date approaches and the task is not yet completed or dismissed.

FIG. 2 is an example travel area 104, according to an embodiment. In the example illustrated in FIG. 2, the travel area 104 is in the shape of a circle. POIs 108A-C are arranged around the travel area 104. The centroid of the travel area 104 is the center of the circle 200. The average distance to the edge of the travel area 104 is the radius of the circle, r, labeled 202. For this example, the radius r is of length three units. The distances between the border of the travel area 104 and the various POIs 108A-C are one, five, and six units, respectively, resulting in an average distance from the border of the travel area 104 to any POI 108A-C of four units. As such, in this example, the reference_distance is equal to the average distance from the center of the circle to the edge of the travel area 104 (three units) plus the average distances between the border of the travel area 104 and the various POIs 108A-C (four units), or seven total units. Assuming a default percentage of 20%, the effective_proximity_measure is calculated by determining 20% of the reference_distance, or 1.4 units. It is understood that the units may be miles, kilometers, or any other distance measurement.

For shapes other than a circle, a method or formula may be used to determine the centroid of the shape. Then based on further analysis, distances from the border of the shape to the centroid may be calculated and averaged to produce the analogous "radius" of the shape. For example, the shape's border may be deconstructed to a group of lines or points. The Euclidean distance from the centroid to a point on a line or a point in space may then be determined. This distance is considered as one sample. A number of samples may be determined and averaged to produce the portion of the reference_distance measurement.

Figure 3:
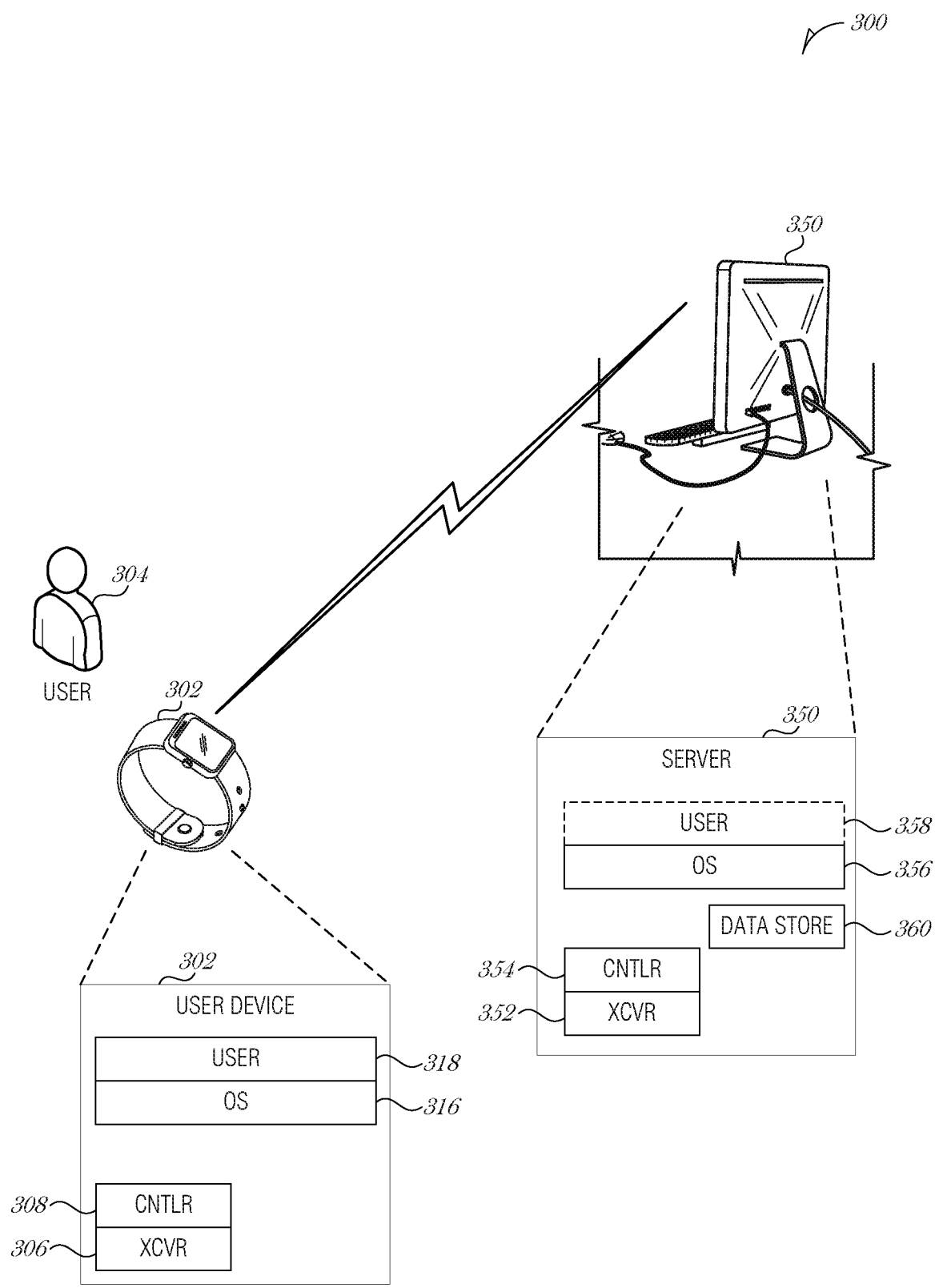
FIG. 3 is a block diagram illustrating a proximity measurement system, according to an embodiment.

FIG. 3 is a block diagram illustrating a proximity measurement system 300, according to an embodiment. The proximity measurement system 300 may include a user device 302 and a server 350. The user device 302 may be any type of device, including but not limited to a laptop, smartphone, wearable device, tablet, hybrid device, or the like. The user device 302 includes a transceiver 306, capable of both sending and receiving data, and controlled by controller 308. The transceiver 306 and controller 308 may be used to communicate over various wireless networks, such as a Wi-Fi network (e.g., according to the IEEE 802.11 family of standards), cellular network, such as a network designed according to the Long-Term Evolution (LTE), LTE-Advanced, 5G or Global System for Mobile Communications (GSM) families of standards, or the like.

Operating system 316 interfaces with the controller 308. Operating system 316 may be a desktop operating system, embedded operating system, real-time operating system, proprietary operating system, network operating system, and the like. Examples include, but are not limited to Windows® NT (and its variants), Windows® Mobile, Windows® Embedded, Mac OS®, Apple iOS, Apple WatchOS®, UNIX, Android™, JavaOS, Symbian OS, Linux, and other suitable operating system platforms.

A communication controller (not shown) may be implemented in hardware, firmware, or in the operating system 316. The communication controller may act as an interface with various hardware abstraction layer (HAL) interface, such as device drivers, communication protocol stacks, libraries, and the like. The communication controller is operable to receive user input (e.g., from a system event or by an express system call to the communication controller), and interact with one or more lower-level communication devices (e.g., Bluetooth radio, Wi-Fi radio, cellular radio, etc.) based on the user input. The communication controller may be implemented, at least in part, in a user-level application that makes calls to one or more libraries, device interfaces, or the like in the operating system 316, to cause communication devices to operate in a certain manner.

A user application space 318 on the user device 302 is used to implement user-level applications, controls, user interfaces, and the like, for a user 304 to control the user device 302. An application, app, extension, control panel, or other user-level executable software program may be used to control access to the user device 302. For example, an executable file, such as an app, may be installed on the user device 302 and operable to communicate with a host application installed on a server 350.

The server 350 may include an operating system, file system, database connectivity, radios, or other interfaces to provide a task reminder service to the user device 302. In particular the server 350 may include, or be communicatively connected to, a radio transceiver 352 to communicate with the user device 302. A respective controller 354 may control the transceiver 352 of the server 350, which in turn is connected with and controlled via an operating system 356 and user-level applications 358.

In operation, the user 304 is tracked as she moves about during her daily routine. The user's location may be periodically polled to obtain the locations the user 304 travels during a tracking period. The tracking period may be any interval, such as an hour, day, or week. The details of the user's whereabouts are stored at the server 350. The details may include locations, frequency of visits, mode of travel, and the like. The server 350 may store the meeting details in data store 360. The data store 360 may be located at the server 350 or at a remote server (e.g., a database server).

The user 304 may create a task reminder on the user device 302, which may be transmitted and stored, at least in part, at the server 350. The task reminder may include details of the task, such as a description, an associated location of where to complete the task, a business name of where to complete the task, a due date for the task, and the like.

The server 350 uses the user's typical roaming area and details of the POIs associated with tasks stored at the server 350 to calculate an effective_proximity_measure, as described above. The server 350 may then create one or more geofences around respective POIs using the effective_proximity_measure as the size of the geofence (e.g., the radius of the geofence).

The server 350 may provide a task reminder notification to the user 304 when the user 302 travels within the effective_proximity_measure geofence of a POI. The notification may be of a variety of types including, but not limited to a text message, an alert screen, a visual alert, an audible alert, a chime, a voice alert, a haptic alert, or the like.

Figure 4:
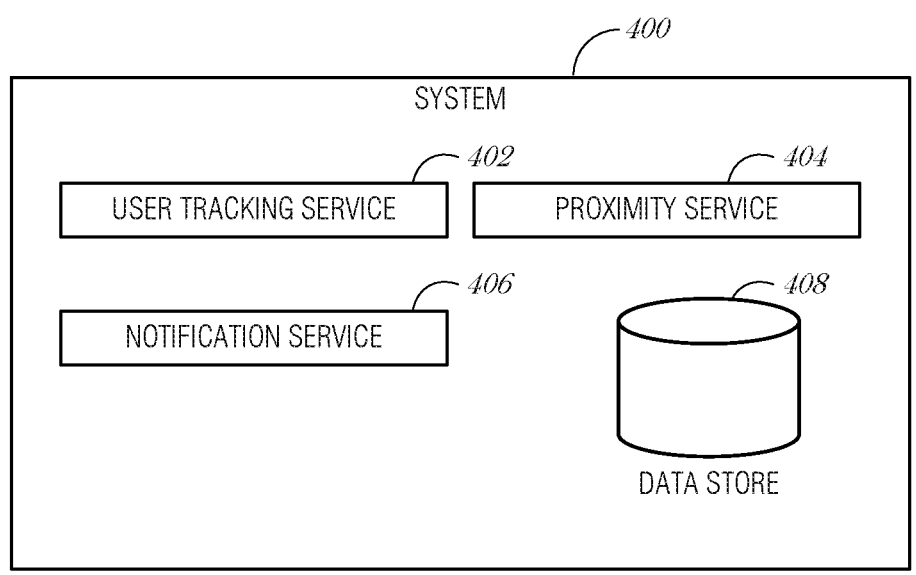
FIG. 4 is a block diagram illustrating a proximity measurement system, according to an embodiment.

FIG. 4 is a block diagram illustrating a proximity measurement system 400, according to an embodiment. The system 400 includes a user tracking server 402, a proximity service 404, and a notification service 406.

The user tracking server 402, proximity service 404, and notification service 406 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

In an embodiment, the user tracking service 402 is configured to calculate a travel area of a user, the travel area representing an area that the user has traveled within during a period of time. In an embodiment, to calculate the travel area, the user tracking service 402 is to receive geographical locations of the user during the period of time and construct a geometric shape that bounds the geographical locations. In a further embodiment, to receive geographical locations, the user tracking service 402 is to receive geographical locations periodically. The periods may be relatively short, such as every minute, or relatively long, such as every hour. In an embodiment, to receive geographical locations periodically, the user tracking service 402 is to receive geographical locations at a periodicity set by the user. The user may set the periodicity to a longer period in order to conserve battery on a mobile device, for example.

The proximity service 404 is configured to identify a reminder task created by the user, the reminder task having an associated point of interest. In embodiments, the associated point of interest is a retail outlet, a professional service, or a government agency. It is understood that the point of interest may be a business or service that has an associated chain, a business or service that has similar businesses or services, or other affiliations. In an embodiment, to identify the reminder task created by the user, the proximity service 404 is to search a data store 408 at the server for the reminder task. The data store 408 may be located remote from the server system in some embodiments.

The proximity service 404 is further to identify a plurality of geographical locations of the point of interest. In an embodiment, to identify the plurality of geographical locations of the point of interest, the proximity service is to identify a business from the reminder task, search for business chain locations of the business, and determine the plurality of geographical locations from the business chain locations. For example, the business may be a retail chain, such as Walmart®, and the locations for Walmart® stores around the user's travel area.

Then, the proximity service 404 is to calculate an effective proximity measure based on the travel area of the user and the plurality of geographical locations.

In an embodiment, to calculate the effective proximity measure, the proximity service 404 is to determine an average distance of a set of distances from a border of the travel area to each of the geographical locations of the point of interest, the set of distances including a shortest linear distance between the border and each respective geographical location. The proximity service 404 may also calculate the sum of the average distance from the border of the travel area to each of the geographical locations and the average distance from the centroid of the area to the border, identify a percentage value, and calculate the effective proximity measure as a percentage of the sum using the percentage value.

In an embodiment, the percentage value is 20%. In another embodiment, to identify the percentage value, the proximity service 404 is to identify a priority of the reminder task and set the percentage value based on the priority. In a further embodiment, the priority of the reminder task changes over time. In a related embodiment, the priority of the reminder task changes over time as a function of a due date for the reminder task.

The notification service 406 may be configured to transmit a notification to the user when the user is within the effective proximity measure of any one of the plurality of geographical locations.

In an embodiment, the notification to the user comprises at least one of: a text message, an audible notification, a verbal notification, a haptic notification, or a visual notification.

In an embodiment, the period of time comprises a week, and in such a configuration, a new travel area of the user is calculated weekly.

Figure 5:
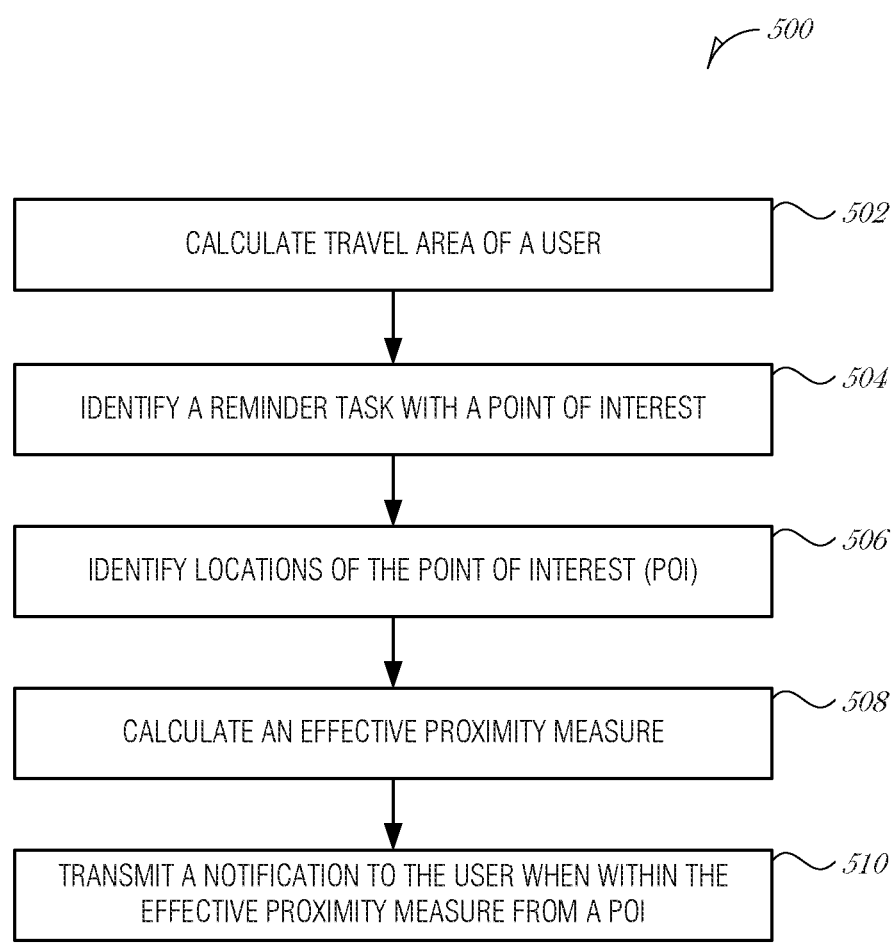
FIG. 5 is a flowchart illustrating a method for providing a proximity measurement system.

FIG. 5 is a flowchart illustrating a method 500 for providing a proximity measurement system, according to an embodiment. At block 502, the method 500 includes calculating, at a server system, a travel area of a user, the travel area representing an area that the user has traveled within during a period of time.

In an embodiment, calculating the travel area comprises: receiving geographical locations of the user during the period of time; and constructing a geometric shape that bounds the geographical locations. In an embodiment, receiving geographical locations comprises receiving geographical locations periodically. In an embodiment, receiving geographical locations periodically comprises receiving geographical locations at a periodicity set by the user.

At block 504, the method 500 includes identifying a reminder task created by the user, the reminder task having an associated point of interest. In an embodiment, identifying the reminder task created by the user comprises searching a data store at the server system for the reminder task. In embodiments, the associated point of interest is a retail outlet, a professional service, or a government agency.

At block 506, the method 500 includes identifying a plurality of geographical locations of the point of interest. In an embodiment, identifying the plurality of geographical locations of the point of interest comprises: identifying a business from the reminder task; searching for business chain locations of the business; and determining the plurality of geographical locations from the business chain locations.

At block 508, the method 500 includes calculating an effective proximity measure based on the travel area of the user and the plurality of geographical locations. In an embodiment, calculating the effective proximity measure comprises: determining an average distance of a set of distances from a border of the travel area to each of the geographical locations of the point of interest, the set of distances including a shortest linear distance between the border and each respective geographical location; determining an average distance from the centroid of the area to the border of the travel area; calculating the sum of the average distance from the border of the travel area to each of the geographical locations and the average distance from the centroid of the area to the border; identifying a percentage value; and calculating the effective proximity measure as a percentage of the sum using the percentage value.

In a further embodiment, the percentage value is 20%. In a related embodiment, identifying the percentage value comprises: identifying a priority of the reminder task; and setting the percentage value based on the priority. In a further embodiment, the priority of the reminder task changes over time. In a related embodiment, the priority of the reminder task changes over time as a function of a due date for the reminder task.

At block 510, the method 500 includes transmitting a notification to the user when the user is within the effective proximity measure of any one of the plurality of geographical locations. In an embodiment, the notification to the user comprises at least one of: a text message, an audible notification, a verbal notification, a haptic notification, or a visual notification.

In an embodiment, the period of time comprises a week, and in such an embodiment, a new travel area of the user is calculated weekly.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
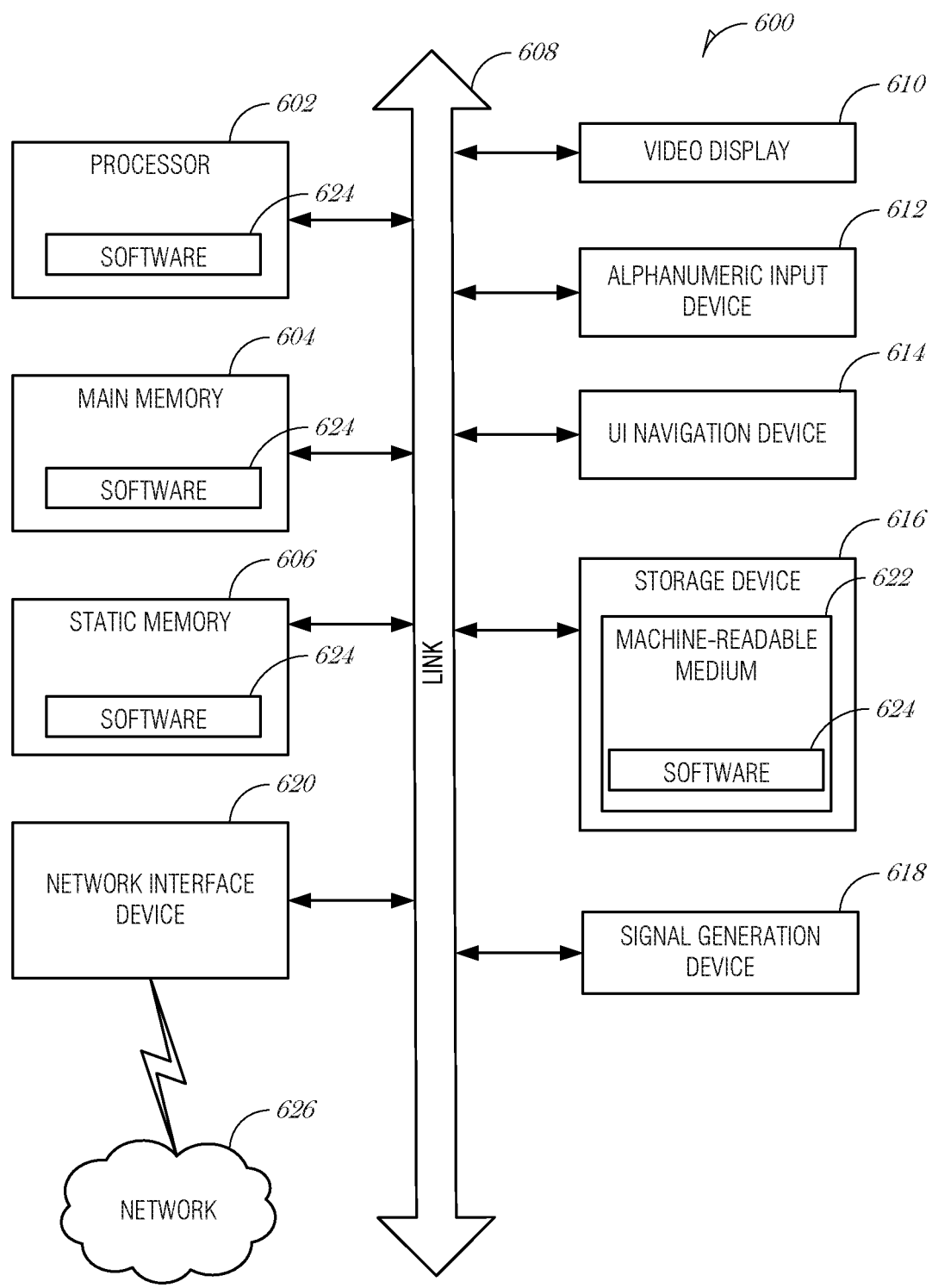
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or, jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a proximity measurement system, the system comprising: a user tracking service to calculate a travel area of a user, the travel area representing an area that the user has traveled within during a period of time; a proximity service to: identify a reminder task created by the user, the reminder task having an associated point of interest; identify a plurality of geographical locations of the point of interest; and calculate an effective proximity measure based on the travel area of the user and the plurality of geographical locations; and a notification service to transmit a notification to the user when the user is within the effective proximity measure of any one of the plurality of geographical locations.

In Example 2, the subject matter of Example 1 optionally includes wherein to calculate the travel area, the user tracking service is to: receive geographical locations of the user during the period of time; and construct a geometric shape that bounds the geographical locations.

In Example 3, the subject matter of Example 2 optionally includes wherein to receive geographical locations, the user tracking service is to receive geographical locations periodically.

In Example 4, the subject matter of any one or more of Examples 2-3 optionally include wherein to receive geographical locations periodically, the user tracking service is to receive geographical locations at a periodicity set by the user.

In Example 5, the subject matter of any one or more of Examples 1-4 optionally include wherein the period of time comprises a week, and wherein a new travel area of the user is calculated weekly.

In Example 6, the subject matter of any one or more of Examples 1-5 optionally include wherein to identify the reminder task created by the user, the proximity service is to search a data store at the server for the reminder task.

In Example 7, the subject matter of any one or more of Examples 1-6 optionally include wherein to identify the plurality of geographical locations of the point of interest, the proximity service is to: identify a business from the reminder task; search for business chain locations of the business; and determine the plurality of geographical locations from the business chain locations.

In Example 8, the subject matter of any one or more of Examples 1-7 optionally include wherein the associated point of interest is a retail outlet, a professional service, or a government agency.

In Example 9, the subject matter of any one or more of Examples 1-8 optionally include wherein to calculate the effective proximity measure, the proximity service is to: determine an average distance of a set of distances from a border of the travel area to each of the geographical locations of the point of interest, the set of distances including a shortest linear distance between the border and each respective geographical location; determine an average distance from the centroid of the area to the border of the travel area; calculate the sum of the average distance from the border of the travel area to each of the geographical locations and the average distance from the centroid of the area to the border; identify a percentage value; and calculate the effective proximity measure as a percentage of the sum using the percentage value.

In Example 10, the subject matter of Example 9 optionally includes wherein the percentage value is 20%.

In Example 11, the subject matter of any one or more of Examples 9-10 optionally include wherein to identify the percentage value, the proximity service is to: identify a priority of the reminder task; and set the percentage value based on the priority.

In Example 12, the subject matter of Example 11 optionally includes wherein the priority of the reminder task changes over time.

In Example 13, the subject matter of any one or more of Examples 11-12 optionally include wherein the priority of the reminder task changes over time as a function of a due date for the reminder task.

In Example 14, the subject matter of any one or more of Examples 1-13 optionally include wherein the notification to the user comprises at least one of: a text message, an audible notification, a verbal notification, a haptic notification, or a visual notification.

Example 15 is a method of providing a proximity measurement system, the method comprising: calculating, at a server system, a travel area of a user, the travel area representing an area that the user has traveled within during a period of time; identifying a reminder task created by the user, the reminder task having an associated point of interest; identifying a plurality of geographical locations of the point of interest; calculating an effective proximity measure based on the travel area of the user and the plurality of geographical locations; and transmitting a notification to the user when the user is within the effective proximity measure of any one of the plurality of geographical locations.

In Example 16, the subject matter of Example 15 optionally includes wherein calculating the travel area comprises: receiving geographical locations of the user during the period of time; and constructing a geometric shape that bounds the geographical locations.

In Example 17, the subject matter of Example 16 optionally includes wherein receiving geographical locations comprises receiving geographical locations periodically.

In Example 18, the subject matter of any one or more of Examples 16-17 optionally include wherein receiving geographical locations periodically comprises receiving geographical locations at a periodicity set by the user.

In Example 19, the subject matter of any one or more of Examples 15-18 optionally include wherein the period of time comprises a week, and wherein a new travel area of the user is calculated weekly.

In Example 20, the subject matter of any one or more of Examples 15-19 optionally include wherein identifying the reminder task created by the user comprises searching a data store at the server system for the reminder task.

In Example 21, the subject matter of any one or more of Examples 15-20 optionally include wherein identifying the plurality of geographical locations of the point of interest comprises: identifying a business from the reminder task;

searching for business chain locations of the business; and determining the plurality of geographical locations from the business chain locations.

In Example 22, the subject matter of any one or more of Examples 15-21 optionally include wherein the associated point of interest is a retail outlet, a professional service, or a government agency.

In Example 23, the subject matter of any one or more of Examples 15-22 optionally include wherein calculating the effective proximity measure comprises: determining an average distance of a set of distances from a border of the travel area to each of the geographical locations of the point of interest, the set of distances including a shortest linear distance between the border and each respective geographical location; determining an average distance from the centroid of the area to the border of the travel area; calculating the sum of the average distance from the border of the travel area to each of the geographical locations and the average distance from the centroid of the area to the border; identifying a percentage value; and calculating the effective proximity measure as a percentage of the sum using the percentage value.

In Example 24, the subject matter of Example 23 optionally includes wherein the percentage value is 20%.

In Example 25, the subject matter of any one or more of Examples 23-24 optionally include wherein identifying the percentage value comprises: identifying a priority of the reminder task; and setting the percentage value based on the priority.

In Example 26, the subject matter of Example 25 optionally includes wherein the priority of the reminder task changes over time.

In Example 27, the subject matter of any one or more of Examples 25-26 optionally include wherein the priority of the reminder task changes over time as a function of a due date for the reminder task.

In Example 28, the subject matter of any one or more of Examples 15-27 optionally include wherein the notification to the user comprises at least one of: a text message, an audible notification, a verbal notification, a haptic notification, or a visual notification.

Example 29 is at least one machine-readable medium including instructions, which when executed by a machine, cause the machine to perform operations of any of the methods of Examples 15-28.

Example 30 is an apparatus comprising means for performing any of the methods of Examples 15-28.

Example 31 is an apparatus of providing a proximity measurement system, the apparatus comprising: means for calculating, at a server system, a travel area of a user, the travel area representing an area that the user has traveled within during a period of time; means for identifying a reminder task created by the user, the reminder task having an associated point of interest; means for identifying a plurality of geographical locations of the point of interest; means for calculating an effective proximity measure based on the travel area of the user and the plurality of geographical locations; and means for transmitting a notification to the user when the user is within the effective proximity measure of any one of the plurality of geographical locations.

In Example 32, the subject matter of Example 31 optionally includes wherein the means for calculating the travel area comprise: means for receiving geographical locations of the user during the period of time; and means for constructing a geometric shape that bounds the geographical locations.

In Example 33, the subject matter of Example 32 optionally includes wherein the means for receiving geographical locations comprise means for receiving geographical locations periodically.

In Example 34, the subject matter of any one or more of Examples 32-33 optionally include wherein the means for receiving geographical locations periodically comprise means for receiving geographical locations at a periodicity set by the user.

In Example 35, the subject matter of any one or more of Examples 31-34 optionally include wherein the period of time comprises a week, and wherein a new travel area of the user is calculated weekly.

In Example 36, the subject matter of any one or more of Examples 31-35 optionally include wherein the means for identifying the reminder task created by the user comprise means for searching a data store at the server system for the reminder task.

In Example 37, the subject matter of any one or more of Examples 31-36 optionally include wherein the means for identifying the plurality of geographical locations of the point of interest comprises: means for identifying a business from the reminder task; means for searching for business chain locations of the business; and means for determining the plurality of geographical locations from the business chain locations.

In Example 38, the subject matter of any one or more of Examples 31-37 optionally include wherein the associated point of interest is a retail outlet, a professional service, or a government agency.

In Example 39, the subject matter of any one or more of Examples 31-38 optionally include wherein the means for calculating the effective proximity measure comprise: means for determining an average distance of a set of distances from a border of the travel area to each of the geographical locations of the point of interest, the set of distances including a shortest linear distance between the border and each respective geographical location; means for determining an average distance from the centroid of the area to the border of the travel area; means for calculating the sum of the average distance from the border of the travel area to each of the geographical locations and the average distance from the centroid of the area to the border; means for identifying a percentage value; and means for calculating the effective proximity measure as a percentage of the sum using the percentage value.

In Example 40, the subject matter of Example 39 optionally includes wherein the percentage value is 20%.

In Example 41, the subject matter of any one or more of Examples 39-40 optionally include wherein the means for identifying the percentage value comprise: means for identifying a priority of the reminder task; and means for setting the percentage value based on the priority.

In Example 42, the subject matter of Example 41 optionally includes wherein the priority of the reminder task changes over time.

In Example 43, the subject matter of any one or more of Examples 41-42 optionally include wherein the priority of the reminder task changes over time as a function of a due date for the reminder task.

In Example 44, the subject matter of any one or more of Examples 31-43 optionally include wherein the notification to the user comprises at least one of: a text message, an audible notification, a verbal notification, a haptic notification, or a visual notification.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more, aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A proximity measurement system, the system comprising:
   a user tracking service to calculate a travel area of a user, the travel area representing an area around a travel path that the user has traveled on during a period of time, the travel path including a plurality of distinct geographic locations;
   a proximity service to:
   identify a reminder task created by the user, the reminder task having an associated point of interest;
   identify a plurality of geographical locations of the point of interest; and
   calculate an effective proximity measure based on the travel area of the user and the plurality of geographical locations; and
   a notification service to transmit a notification to the user when the user is within the effective proximity measure of any one of the plurality of geographical locations,
   wherein to calculate the effective proximity measure, the proximity service is to:
   determine a distance from the travel path in the travel area, the distance used to establish a border of the travel area, and the travel path being a portion of a route traveled in the travel area by the user during the period of time;
   determine an average distance from the border to the plurality of geographical locations;
   calculate the sum of the distance from the travel path to the border and the average distance from the border to the plurality of geographical locations;
   identify a percentage value; and
   calculate the effective proximity measure as a percentage of the sum using the percentage value.

2. The system of claim 1, wherein to calculate the travel area, the user tracking service is to:
   receive geographical locations of the user during the period of time; and
   construct a geometric shape that bounds the geographical locations.

3. The system of claim 2, wherein to receive geographical locations, the user tracking service is to receive geographical locations periodically.

4. The system of claim 2, wherein to receive geographical locations periodically, the user tracking service is to receive geographical locations at a periodicity set by the user.

5. The system of claim 1, wherein the period of time comprises a week, and wherein a new travel area of the user is calculated weekly.

6. The system of claim 1, wherein to identify the reminder task created by the user, the proximity service is to search a data store at a server for the reminder task.

7. The system of claim 1, wherein to identify the plurality of geographical locations of the point of interest, the proximity service is to:
   identify a business from the reminder task;
   search for business chain locations of the business; and
   determine the plurality of geographical locations from the business chain locations.

8. The system of claim 1, wherein to identify the percentage value, the proximity service is to:
   identify a priority of the reminder task; and
   set the percentage value based on the priority.

9. The system of claim 8, wherein the priority of the reminder task changes over time.

10. The system of claim 8, wherein the priority of the reminder task changes over time as a function of a due date for the reminder task.

11. The system of claim 1, wherein the notification to the user comprises at least one of: a text message, an audible notification, a verbal notification, a haptic notification, or a visual notification.

12. A method of providing a proximity measurement system, the method comprising:
   calculating, at a server system, a travel area of a user, the travel area representing an area around a travel path that the user has traveled on during a period of time, the travel path including a plurality of distinct geographic locations;

identifying a reminder task created by the user the reminder task having an associated point of interest;

identifying a plurality of geographical locations of the point of interest;

calculating an effective proximity measure based on the travel area of the user and the plurality of geographical locations; and transmitting a notification to the user when the user is within the effective proximity measure of any one of the plurality of geographical locations, wherein calculating the effective proximity measure comprises:

determining a distance from a travel path in the travel area, the distance used to establish a border of the travel area, and the travel path being a portion of a route traveled in the travel area by the user during the period of time;

determining an average distance from the border to the plurality of geographical locations;

calculating the sum of the distance from the travel path to the border and the average distance from the border to the plurality of geographical locations;

identifying a percentage value; and calculating the effective proximity measure as a percentage of the sum using the percentage value.

13. The method of claim 12, wherein calculating the travel area comprises:

receiving geographical locations of the user during the period of time; and constructing a geometric shape that bounds the geographical locations.

14. The method of claim 13, wherein receiving geographical locations comprises receiving geographical locations periodically.

15. The method of claim 13, herein receiving geographical locations periodically comprises receiving geographical locations at a periodicity set by the user.

16. The method of claim 12, wherein the period of time comprises a week, and wherein a new travel area of the user is calculated weekly.

17. The method of claim 12, wherein identifying the plurality of geographical locations of the point of interest comprises:

identifying a business from the reminder task;

searching for business chain locations of the business; and determining the plurality of geographical locations from the business chain locations.

18. The method of claim 12, wherein the percentage value is 20%.

19. At least one non-transitory machine-readable medium including instructions, which when executed by a machine, cause the machine to:

calculate, at a server system, a travel area of a user, the travel area representing an area around a travel path that the user has traveled on during a period of time, the travel path including a plurality of distinct geographic locations;

identify a reminder task created by the user, the reminder task having an associated point of interest;

identify a plurality of geographical locations of the point, of interest;

calculate an effective proximity measure based on the travel area of the user and the plurality of geographical locations; and transmit a notification to the user when the user is within the effective proximity measure of any one of the plurality of geographical locations, wherein the instructions to calculate the effective proximity measure comprise instructions to:

determine a distance from a travel path in the travel area, the distance used to establish a border of the travel area, and the travel path being a portion of a route traveled in the travel area by the user during the period of time;

determine an average distance from the border to the plurality of geographical locations;

calculate the sum of the distance from the travel path to the border and the average distance from the border to the plurality of geographical locations;

identify a percentage value; and calculate the effective proximity measure as a percentage of the sum using the percentage value.

20. The non-transitory machine-readable medium of claim 19, wherein the instructions to calculate the travel area comprise instructions to:

receive geographical locations of the user during the period of time; and construct a geometric shape that bounds the geographical locations.

* * * * *

UNITED STATES PATENT AND TRADEMARK OFFICE
CERTIFICATE OF CORRECTION

PATENT NO. : 11,272,318 B2
APPLICATION NO. : 16/814708
DATED : March 8, 2022
INVENTOR(S) : Marian et al.

It is certified that error appears in the above-identified patent and that said Letters Patent is hereby corrected as shown below:

In the Claims

Column 17, Line 4, in Claim 12, after "user", insert --,--

Column 17, Line 38, in Claim 15, delete "herein" and insert --wherein-- therefor Column 18, Line 17, in Claim 19, delete "point," and insert --point-- therefor Signed and Sealed this
Seventeenth Day of May, 2022

Katherine Kelly Vidal
*Director of the United States Patent and Trademark Office*